Figure 1:
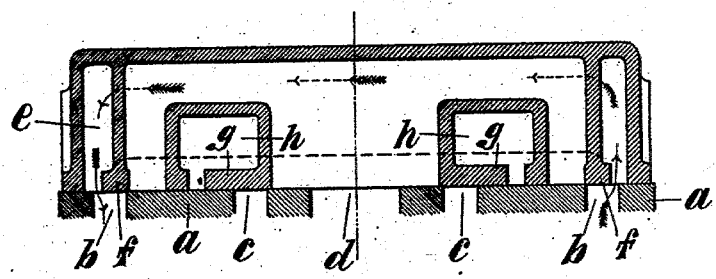

(No Model.)  
5 Sheets—Sheet 1.

J. THOM.
STEAM ENGINE DISTRIBUTION VALVE.

No. 514,392. Patented Feb. 6, 1894.

Witnesses.
J. A. Rutherford
J. Harry Daly

Inventor.
John Thom
By James L. Norris
Attorney.

(No Model.) 5 Sheets—Sheet 2.

J. THOM.
STEAM ENGINE DISTRIBUTION VALVE.

No. 514,392. Patented Feb. 6, 1894.

Witnesses.
J. A. Rutherford
J. Harry Daly

Inventor.
John Thom
By James L. Norris
Attorney (No Model.)  5 Sheets—Sheet 3.
J. THOM.
STEAM ENGINE DISTRIBUTION VALVE.
No. 514,392. Patented Feb. 6, 1894.
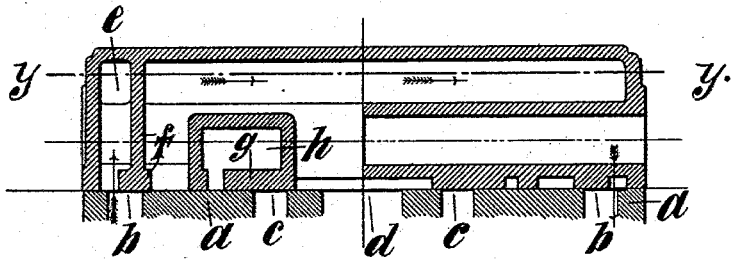
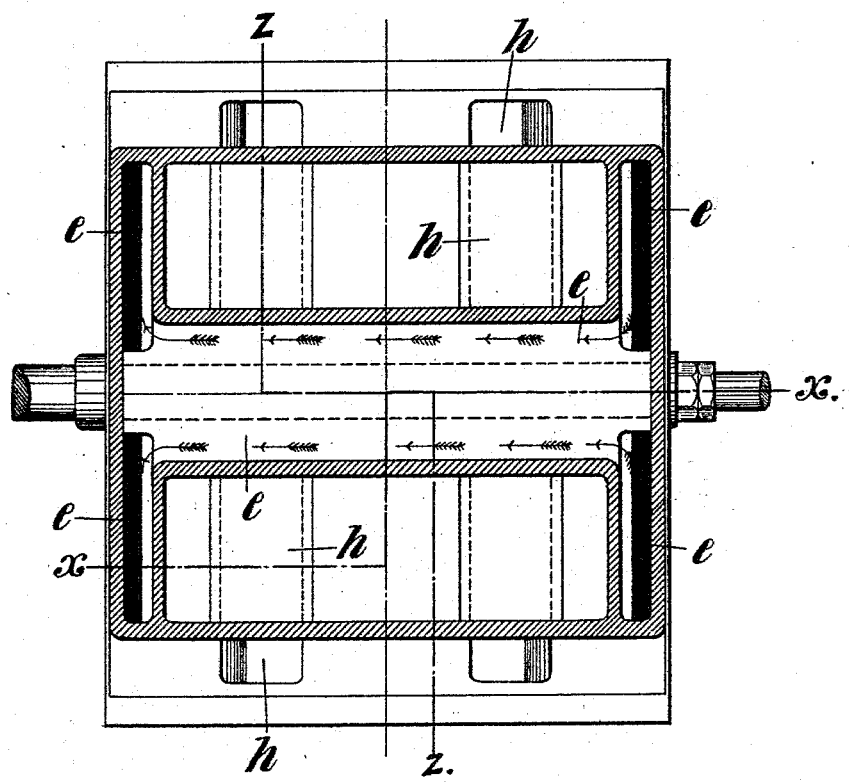
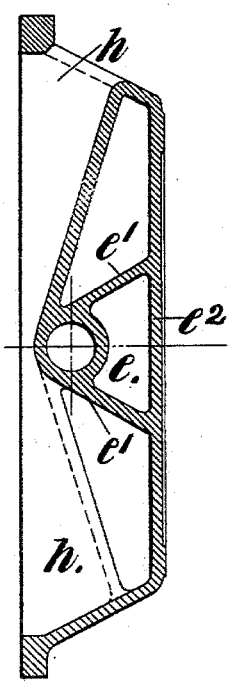
Witnesses.
J. A. Rutherford
J. Harry Daly
Inventor.
John Thom
By James L. Norris
Attorney

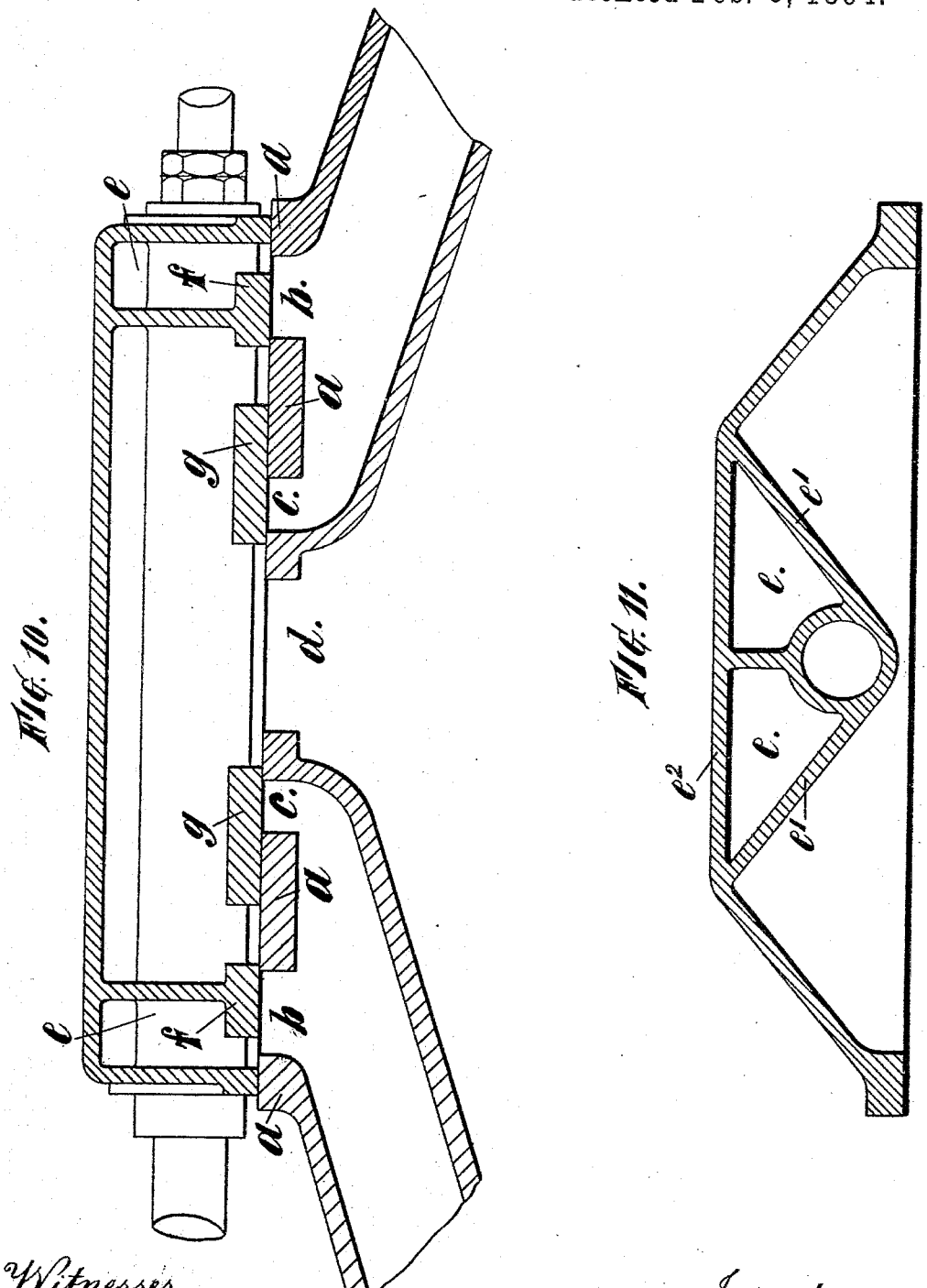

(No Model.) 5 Sheets—Sheet 5.
J. THOM.
STEAM ENGINE DISTRIBUTION VALVE.
No. 514,392. Patented Feb. 6, 1894.
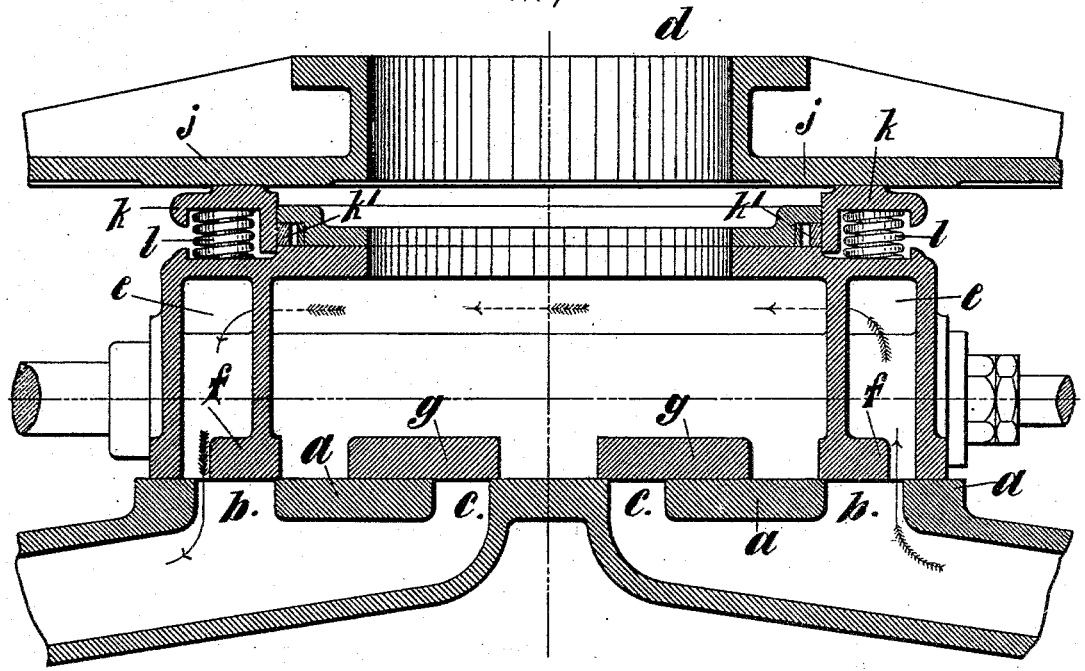
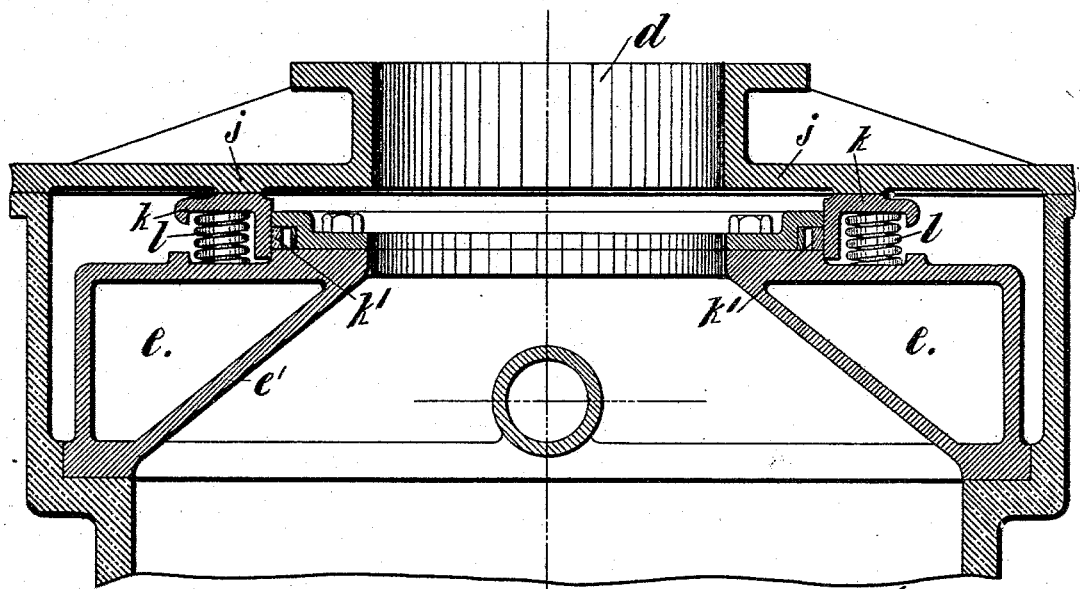
Witnesses.
J. A. Rutherford.
J. Harry Daly.
Inventor.
John Thom.
By James L. Norris.
Attorney

UNITED STATES PATENT OFFICE.

JOHN THOM, OF INVERKIP, SCOTLAND.

STEAM-ENGINE DISTRIBUTION-VALVE.

SPECIFICATION forming part of Letters Patent No. 514,392, dated February 6, 1894.

Application filed September 5, 1891. Serial No. 404,862. (No model.) Patented in England September 23, 1889, No. 14,957.

*To all whom it may concern:*

Be it known that I, JOHN THOM, a subject of the Queen of Great Britain and Ireland, residing at Inverkip, in the county of Renfrew, Scotland, have invented certain new and useful Improvements in Steam-Engine Distribution-Valves, (for which I have obtained a patent in Great Britain September 23, 1889, No. 14,957;) and I do hereby declare that the following is a full, clear, and exact description of the invention, which will enable others skilled in the art to which it appertains to make and use the same.

My improvements connected with distribution valves of steam engines have reference more particularly to such valves, wherein and whereby steam is conveyed from one side of the piston of the cylinder, at the end of each stroke, for re-use at the other side of the piston, by leading the steam through the valve and arranging the ports thereof in relation to those of the cylinder, so that communication is open between the ends of the cylinder by way of said passage at the end of the stroke. To this end valves have been constructed with what is known as a "trick" passage, the inside edges of the ports on the face of which were formed and arranged so as to have a negative lap, thereby effecting the required communication between the ends of the cylinder at the right time, the passage itself being disposed on the back of the valve.

According to my present invention I form the passages in the valve which convey the steam from one cylinder to the other in and through a passage or passages within the valve itself, and not over the back, as I find that by this improvement the hogging of the valve which sometimes occurs when the passage is at the back is obviated, and its weight reduced. At the same time I so arrange this passage in the valve that it does not interfere with the proper working of the valve and flow of steam therethrough. I also, according to the present invention, effect a more rapid movement of steam from one end of the cylinder to the other end, through the valve, by way of said passage; and I do this by putting the passage, by which said communication is made between the opposite ends of the cylinder, momentarily in communication with an exhaust port, just prior to such communication being effected. This action is carried out in a valve having such a passage—and according to this invention—by providing a negative lap on the inner edges of the passage, and such a less amount of positive lap on the edges of the valve controlling the exhaust from the cylinder, as will cause negative exhaust lap to exist at the time communication, by way of the passage, is first made.

The operations taking place in a cylinder and valve having a passage, according to my present invention, may be enumerated or set out as follows:

*a.* Steam cut off and expansion commences.

*b.* Steam passes through valve (by way of the passage), to opposite end of the cylinder, and partly and momentarily to exhaust port, or condenser.

*c.* Exhaust passage at compression end of cylinder closed, and opposite ones open a little afterward.

*d.* Passage through the valve closed and compression commences.

*e.* Initial or working steam enters compression end of cylinders and valve keeps open till cut off.

The invention herein described is alike applicable to "slide valves" and to "piston valves."

In the various drawings which serve to illustrate my invention I show some examples of constructions of valves with my present improvements applied thereto.

Figure 2:
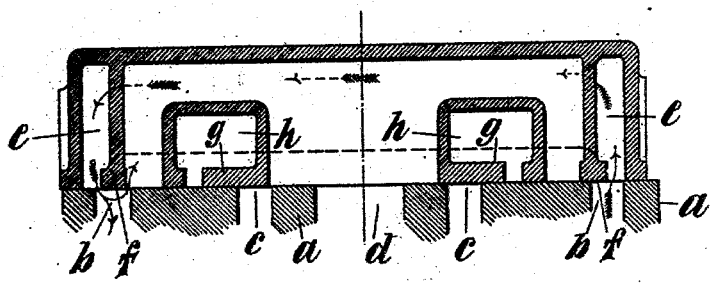

Figure 1 is a sectional elevation of a valve and cylinder ports of an engine according to this invention, the valve being shown in the central portion. Fig. 2 is a view of the valve in the position when momentary communication is made with the exhaust port of the engine at the commencement of the time when the communication between the two ends of the cylinder is made by the passage in the valve. Figs. 3, 4, 5 and 6 illustrate in sectional elevation, a double ported slide valve, and cylinder ports and face according to this invention, the different figures representing the valve in different positions on the cylinder port face. Fig. 7 is a sectional elevation taken at the line $xx$ Fig. 8 showing the valve according to this invention. Fig. 8 is a plan of same taken at the line $yy$ Fig. 7. Fig. 9 is a cross section of the valve at $zz$ Fig. 8.

Fig. 10 is a longitudinal section of another form of valve according to this invention. Fig. 11 is a cross section of same through the center of the valve. Fig. 12 is a longitudinal section, and Fig. 13 is a cross section of a valve, according to this invention, adapted to exhaust through the back thereof.

In the drawings the same letters of reference are used throughout to denote the same or equivalent parts wherever they occur.

In the drawings, $a$ is the cylinder valve face having ports, $b, c$, and $d, d$ being the exhaust port; $e$ is the passage through the valve by which steam is carried from one end thereof to the other, and $e'$, $e^2$ are the walls forming or inclosing the said passage; $h$ are pockets in the valve forming steam passages and ports therein; $o$ is the engine cylinder, and $p$ is the piston thereof.

In Fig. 1 the negative lap of the inner edge of the passage $e$, and the small amount of positive lap of the bars $f$ are clearly seen. This figure and Fig. 2 show the bars $f$ of the valve to be of such a width relatively to the width of the port $b$, and so arranged in relation thereto, that at the time communication between the opposite ends of the cylinder, by way of the passage $e$, is first made, there will be negative lap at both edges of such bar; that is to say, the bar $f$ at that end of the cylinder to which steam is to be transferred stands at a point between the edges of the metal forming the port $b$ (i. e., such port will be partly uncovered by the bar $f$ at both edges) and steam from the cylinder will be free to flow momentarily by way of the space between said edges (i. e., the port so uncovered) to the exhaust port $d$. The bars $g$ of the steam pocket $h$ would be so disposed and arranged relatively with the port $c$, that such bar $g$ also uncovers the port $c$ at this time.

Figure 3:
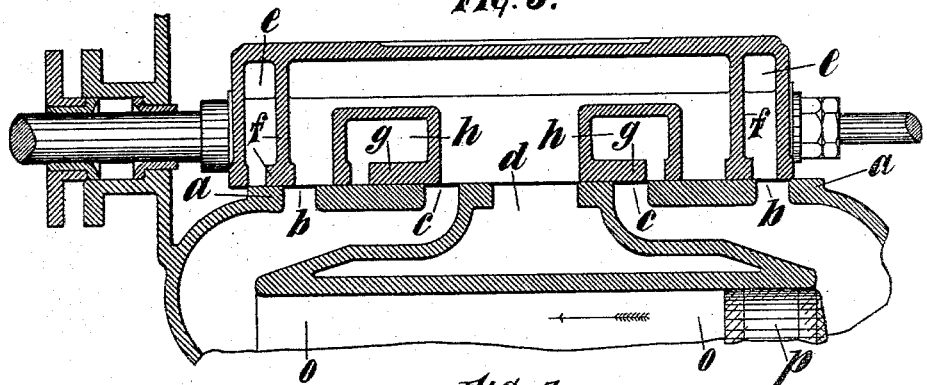
Figure 4:
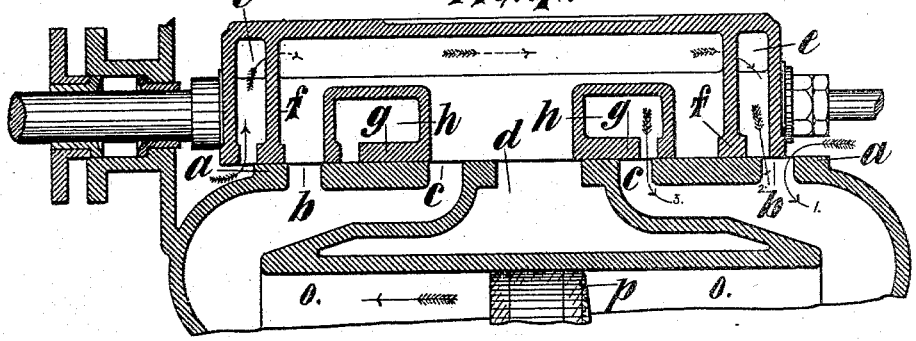
Figure 5:
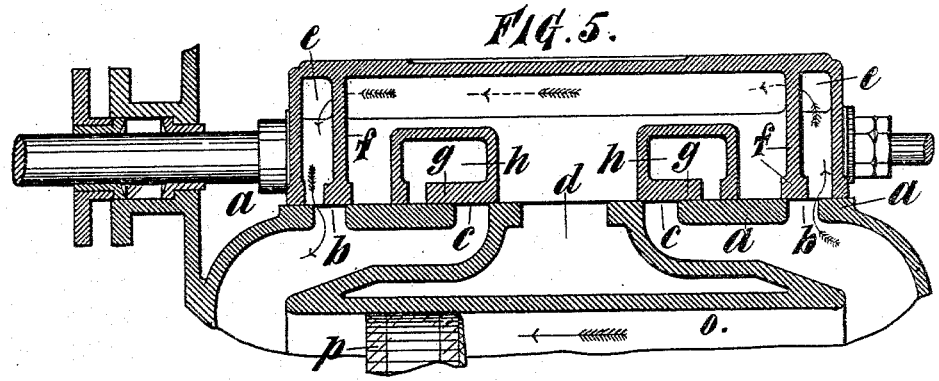
Figure 6:
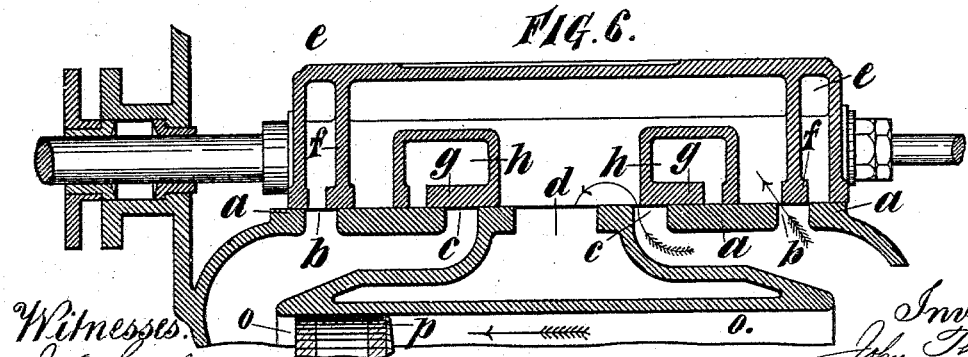

With reference to Figs. 3 to 6 inclusive, Fig. 3 shows the relative position of the valve and piston when the piston is at the end of the stroke and about to return, and just at the point of admitting steam to the cylinder at that end. The relative position shown in Fig. 4 of the valve and piston is that when the steam ports to one end of the cylinder are still open and the piston traveling at the maximum velocity, the other end of the cylinder being open to exhaust. In Fig. 5 the relative position of valve and piston is that when communication between the top and bottom of the cylinder is made by way of the passage $e$, and one end of the cylinder is being filled with steam, at terminal pressure, just prior to the compression at that end, from the other end of the cylinder. Fig. 6 shows the position of valve and piston during the time compression is still continuing at the end of the cylinder which has been filled with steam from the other, and the remaining quantity of steam at the opposite end is exhausting from the cylinder through the valve to the exhaust port $d$.

It will be seen, that a rapid movement of team from one end of the cylinder to the other end, through the valve by the passage, will be effected by putting that passage, by which said communication is made, between the opposite ends of the cylinder, momentarily in communication with the exhaust port; this being done as above stated, by providing the negative lap on the inner edges of the bar $f$, and only a small amount (i. e. less than heretofore) of positive lap on the edges of the valve controlling the exhaust from the cylinder.

In the arrangement shown in the Figs. 3 to 6, at the time maximum velocity of the piston is taking place, there will be three inlets for steam. This is shown by the arrows 1, 2, 3 in Fig. 4.

With regard to the passage $e$ it will be seen that in Figs. 1, 2 and 7, this passage runs through the center portion of the valve, and at each end spreads out into the full width of the valve at right angles to the through passage. In Figs. 12 and 13, on the other hand, the passage $e$ is at each side of the valve and through it, longitudinally, and opens out into a transverse passage at each end across the whole width of the valve. From these two examples it will be plain the passages $e$ may be disposed anywhere within the valve longitudinally, so long as it does not interfere with the steam exhaust ports of the valve. A valve, therefore, provided with this improvement with respect of the passage $e$ may be made practically of the same size and weight as an ordinary slide valve, and give the same amount of port opening, whereas in valves heretofore constructed with a "trick" passage for the purpose of conveying steam from one end of the cylinder to the other, as well as for supplying steam from the valve box, the size and weight of such valve is greater than the ordinary valve, which frequently causes hogging of the valve, and in itself is difficult to make, and is costly.

With reference to Figs. 10 to 13, the steam pockets and ports $h$ in the valve shown in Figs. 1 to 7 are dispensed with, and simple bars $g$ are used to control the communication between the exhaust space of the valve and the ports $c$. In the valve shown in Figs. 12 and 13 the exhaust of steam takes place through the back of the valve, and the conduit $d$ on the cover $j'$ of the valve case, and therefore no exhaust port in the cylinder is provided. Steam is prevented from passing from the interior of the valve case to the conduit $d$ by a sliding frame $k$ on the valve, the outer part of which bears on the inner side of the cover $j$. This frame has free movement in the vertical plane to that of the valve face, and is normally pressed on to the cover $j$ by the springs $l$, a steam tight connection between the frame $j$ and the valve being effected by the spring packing ring $k'$, which is held in the upper part of the valve and pressed on to the inside edge of frame $k$. This frame it will be seen at the same time serves as a means of relieving the back of the valve from the pressure of steam which would otherwise act thereon and press it on to the cylinder valve face.

Under this invention, piston valves having passages therein to convey steam from one end of the cylinder to the other for the purpose of re-using such steam over again for compression purposes, may be provided with means, that is constructed, to effect a momentary exhaust to the exhaust port of the engine prior to the putting in communication of the opposite ends of the cylinder, for the purposes herein specified, in a similar or equivalent manner as that set forth above, whether the steam be introduced into the valve casing between the valve heads or at the opposite ends of such heads.

Having now fully described my invention, I declare that what I claim in respect thereof is—

1. The herein described improvement connected with the steam distribution valves of steam engines, consisting in the combination with a cylinder having a valve face and provided at each end portion with a port having direct communication with the cylinder, of a valve having a passage or passages through it by which communication is made direct between the opposite ends of the cylinder for conveying its steam from one end to the other of said cylinder, and adapted to put the end of the cylinder from which steam is conveyed to the other momentarily in communication with the exhaust port or passage of the valve by way of said communicating passage, for the purposes set forth.

2. The combination with a cylinder having a valve face and provided at each end portion with the pair of ports $b$ and $c$ both having direct communication with the cylinder, of a slide-valve having a passage or passages $e$ disposed between the back of the valve and the face thereof, running longitudinally from one end to the other and opening out at each end into a port running from side to side of the valve, said passage or passages being adapted to convey steam direct from one end of the cylinder to the other for compression therein and re-use, and adapted to put the end of the cylinder from which steam is conveyed to the other momentarily in communication with the exhaust-port or passage of the valve, substantially as described.

In testimony whereof I hereunto affix my signature in presence of two witnesses.

JOHN THOM.

Witnesses:
   FREDERICK JOHN CHEESBROUGH,
   JAMES ANDREW CONBROUGH,
      *Both of* 15 *Water Street, Liverpool.*